United States Patent Office 3,392,026
Patented July 9, 1968

3,392,026
AMMONIATION PROCESS FOR DETOXIFYING THE SEEDS OF *CRAMBE ABYSSINICA* AND RAPE
Gus C. Mustakas, Peoria, and Larry D. Kirk, East Peoria, Ill., assignors to the United States of America as represented by the Secretary of Agriculture
No Drawing. Filed Aug. 4, 1965, Ser. No. 477,332
1 Claim. (Cl. 99—2)

ABSTRACT OF THE DISCLOSURE

A process for debittering and detoxifying thioglucoside-containing seeds such as *Crambe abyssinica* and Brassica (rape) comprising: steaming the seed material at 200–215° F. to inactivate enzymes, contacting the seed material with reactants ammonia gas and aqueous ammonium hydroxide, subjecting the ammoniated seed material to live steam and finally drying under reduced pressure.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for chemically detoxifying and substantially debittering the hexane-defatted thioglucoside-containing seed meals belonging to the genus Brassicia which genus is also loosely called the "mustard family," deriving from the presence in the seeds of the common mustards, *Brassicia juncea* and *B. niger* of a thioglucoside that on hydrolysis yields allyl isothiocyanate (mustard oil).

More particularly, this invention relates to an ammoniation process for chemically detoxifying and debittering the thioglucoside-containing but highly proteinaceous press cake materials remaining after the organic solvent extraction of the industrially valuable unsaturated oils contained especially in the highly bitter seeds of the herbs *Brassica napus* (rape) and *B. campestris* and in the practically identical seeds of the botannical relative, *Crambe abyssinica*, of the family Cruciferae, which is practically unknown domestically.

The seeds of the several species of mustard herb are known to contain a thioglucoside that upon enzymatic or acid hydrolysis yields allyl isothiocyanate (oil of mustard) which, being volatile, is readily removed by distillation. The herb *Brassica napus* (rape), of the mustard family, is grown as a forage crop for sheep, and the seeds are the source of rapeseed oil. Although the seeds of these particular herbs contain only a very small amount of the thioglucoside that on hydrolysis yields allyl isothiocyanate, roughly 9 percent by weight of the hexane-defatted marc or seedcake of crambe is a hydrolyzable thioglucoside whose free aglycone, presumably 2-hydroxy-3-butenyl isothiocyanate, cyclizes to a nonvolatile systemically toxic thiooxazolidone-type compound. The seed materials also contain a much smaller proportion of mustard oil thioglucoside. Ruminants apparently can completely detoxify moderate amounts of the thiooxazolidone derivative and do not show toxic effects when their diet includes only a minor proportion of Crambe meal. However, young chickens are extremely sensitive to the thiooxazolidone type compound, whether ingested as such or formed in situ, and the chicks rapidly develop enlarged thyroids and even lethal systemic effects that clearly prevent the use of undetoxified rapeseed or Crambe meals in poultry diets. Thus, the contemplated sale of the defatted Crambe and rapeseed residues as inexpensive components of poultry feeds and as a major dietary component in livestock feeds requires that the defatted meals or flakes contain neither the potentially toxic major thioglucoside nor the liberated aglycone either per se or as the highly goitrogenic 5-vinyl-oxazolidine-2-thione derivative thereof. In addition, for greater acceptability even when used as a relatively minor component of a feed mix, the detoxification process must also accomplish the removal of chemical debittering of the small amount of the intensely bitter alkaloid sinapine.

Although the economic value of such widely favored oilseeds as those of cotton, peanuts, and soybeans rests primarily in the oils, the freedom from disposal problems and the sizable additional financial returns that can be obtained from the sale of the defatted seedcake residues as feed for livestock, chickens, and other farm creatures would strongly extend the cultivation of Crambe and rape.

*Crambe abyssinica* is virtually unknown in farming circles. Within the last year or two a very limited acreage has been planted to provide the U.S.D.A. with seed for research mainly on the extractable oil and on processes for economically obtaining the oil from the seed without appreciable thioglucoside contamination. However, enthusiastic evaluation announcements from reliable testing laboratories to the effect that Crambe seed oil has special qualities as a mold release agent, possibly because of its extraordinarily high erucic acid content, has caused vegetable oil processors to urge the planting of Crambe as quickly as seed becomes available. Thus, while it is expected that farmers will soon devote large acreages to Crambe in expectation of a high return from the oils, it is also clear that a more extensive cultivation can be expected if the highly proteinaceous defatted byproduct seedcake has been inexpensively detoxified and debittered so that it can be sold as an additive for poultry feeds and/or for the feeding of livestock.

As shown in our Patent No. 3,173,792, detoxification and debittering of Crambe flakes is achieved by holding the tempered flakes at 122° F. for about 15 minutes to provide hydrolysis of the thioglucosides by the endogenous enzymes, followed by steaming, and then by solvent extraction of the oil. However, the patented process does not provide for possible biological variations in the concentration of native enzyme. Most importantly, however, our patented process is not as conveniently susceptible to employment as a continuous process.

Accordingly, a principal object of our present invention is the provision of a process for chemically detoxifying and debittering defatted *Crambe abyssinica* and rapeseed flakes or meals so that these can have utility and economic value for poultry and animal feeds rather than being a problem for disposal. Another object is the provision of a process wherein the previous storage history of the seeds need not be considered since the presence of undamaged enzyme is not a requirement. Yet another object is the provision of a process that can be operated in a continuous manner. Still another object is the provision of a process wherein the chemical detoxification is accompanied by an enrichment in the nitrogen content and thus the feed value of the flakes or meal. Other objects and advantages will be readily apparent from the following detailed description of the invention.

We have in the present invention now discovered that flakes and meals of hexane-defatted crambe and rapeseeds are detoxified and debittered by reaction with ammonia gas or ammonium hydroxide solution providing the intact thioglucosides prior to the ammonia treatment have been protected from enzymatic hydrolysis by heating the flakes to an enzyme-inactivating temperature of about 200–220° F., e.g., with sparge steam for about 15 to 30 minutes or, preferably, from the equivalent heating applied in the conventional desolventization and toasting steps.

We have found that whereas ammonia reacts with and detoxifies the intact thioglucosides, it apparently does not readily react at only moderately elevated temperatures with the 5-vinyloxazolidine-2-thione formed by the almost instantaneous cyclization of enzymatically liberated 2-hydroxy-3-butenyl isothiocyanate. Since the increased moisture content and the initial increments of the heating required for the ammoniation would tend to activate the endogenous enzymes, it is essential for obtaining a completely detoxified product that the enzymes be inactivated prior to ammoniation. Feeding tests on groups of day-old chicks (Table I) show that after 28 days of a corn-soy protein diet (control) the weight of the normal thyroids was 10.1 mg. per 100 g. of chick body weight. The thyroid glands in the group fed the same ration excepting for substitution of 20 percent thereof by the ammonia detoxified crambe meal of Example 2 wherein the endogenous enzymes were deactivated prior to the ammoniation to prevent enzymatic hydrolysis of the thioglucosides had a statistically normal thyroid weight of 11.4 mg. 100 g. of body weight compared with a thyroid weight of 20–30 mg. per 100 g. in the group receiving a ration in which the partial substitution was by crambe in which the enzymes had not been heat inactivated prior to the ammoniation. Where the ammoniation was preceded by an enzymatic hydrolysis step the thyroid enlargement was accompanied by a 10 percent mortality. The thyroid weight of 11 surviving chicks out of 20 given a diet in which the substitution was with a nonammoniated commercially defatted crambe that had been desolventized and toasted at about 100° C. was 82.5 mg. per 100 g. of body weight. As expected, when the partial substitution was with untreated (raw) Crambe meal, all 20 of the chicks died of generalized toxic effects considerably before the end of the 28-day test period.

Although the ammoniation of the enzyme-deactivated crambe flakes or meal proceeds at atmospheric pressure, the use of pressures up to about 30 p.s.i.g. and of elevated temperatures, e.g., up to about 230° F., is preferable. Although the reaction of ammonia with the intact crambe thioglucosides has been found to be equimolar, ammonia uptakes of 0.005 to 0.015 pound per pound of meal indicate that the ammonia also combines with other constituents. The sequential additions of ammonia shown in the examples were employed for analytical convenience, but it is obvious that in accordance with the type of process, any other mode of ammonia admittance and reaction could be employed.

Example 1

At our direction a commercial processor of vegetable oils subjected a 3,000-pound batch of hexane-extracted meal from dehulled *Crambe abyssinica* seeds to toasting for 30 minutes in a steam emitting commercial desolventizer-toaster that almost instantaneously provided temperatures of about 230° F., i.e., well above the myrosinase-inactivation temperature of 175° F. The Crambe oil was found to be free of contamination with sulfur, and beyond this, forms no part of the present invention.

A 250-pound aliquot of the above enzyme-deactivated meal analyzed by weight 6.18 percent nitrogen, thioglucoside 8.6 percent, as well as a considerable amount of the bitter alkaloid sinapine as shown by an intense fluorescence under U.V. light. The meal was introduced into a steam-jacketed spherical cooker rotating on a horizontal axis so as to tumble the meal. Gaseous ammonia was admitted until the pressure in the cooker reached 10 p.s.i.g. Following a period of 5 minutes for absorption and reaction, ammonia gas was again admitted to the same pressure, a sequence of seven such admissions being given. Immediately after the seventh admission the double-walled jacket of the cooker was heated by live steam at 230° F., thereby increasing the pressure in the cooker to about 25 p.s.i.g. After maintaining the heating for 30 minutes the cooker was vented and the ammoniated meal was transferred to a ribbon blender having steam admitting means, wherein the steam-moistened meal was further mixed for 30 minutes before lowering the moisture content with dry heat and slight vacuum. Chromatographic analysis of the air-cooled meal showed that it contained zero-percent thioglucoside, zero-percent thiooxazolidone, and zero sinapine (confirmed by absence of fluorescence under U.V.). The Kjeldahl analysis showed 7.44-percent nitrogen.

When the above procedure was duplicated excepting that the temperature following the last admission of ammonia was increased only to 212° F. (13 p.s.i.g.) there was a residual thiooxazolidone value of 0.03 percent as well as appreciable sinapine fluorescence.

TABLE I.— CHICK FEEDING TESTS WITH AMMONIATED VS. NONAMMONIATED CRAMBE MEALS

| Diet | Average wt. week | | | | Number of survivors out of 20 chicks | Thyroid wt. mg./100 g. of body wt. (survivors) |
| --- | --- | --- | --- | --- | --- | --- |
| | 1 | 2 | 3 | 4 | | |
| 1:1 Soy-corn control | 74 | 155 | 259 | 386 | 20 | 10.1 |
| Crambe meal, heat treated and ammoniated [1] | 74 | 139 | 219 | 316 | 20 | 11.4 |
| Crambe meal, heat treated but not ammoniated [1] | 75 | 106 | 159 | 243 | 11 | 82.5 |
| Raw Crambe meal [1] | | | | | ([2]) | |

[1] Mixed with 4 parts by weight of standard soy-corn ration.
[2] All dead.

Although the shortage of Crambe meal has prevented extensive feeding tests on mature cattle, a land-grant experiment station enthusiastically informed us that a small group of cows that had only nibbled at pellets of heat-treated but nonammoniated Crambe meal, "lapped up" the roughly 130 pounds of unpelleted ammonia-treated Crambe meal that we were able to provide.

Example 2

A 6-pound batch of Crambe meal identical with the meal treated in Example 1 was placed into a cooker like that previously used but having a 1.6 cu. ft. capacity. Ammonia gas was admitted three times to a pressure of 10 p.s.i.g. at 15-minute intervals. Immediately after the third addition of ammonia, the cooker jacket was heated by steam to 230° F. thus increasing the pressure to 30 p.s.i.g. After 30 minutes of reaction at the elevated temperature the ammoniated meal was transferred to a cooker also having sparge steaming means. The moisture content of the meal was raised to 30 percent by the sparge steam, and the temperature held at 180° F. After 30 minutes of steaming, the meal was partially dried and then discharged. Analysis of the meal showed a nitrogen value of 7.17 percent, zero thioglucoside and thiooxazolidone values, and the absence of any sinapine fluorescence. This meal, diluted with 4 parts by weight of a standard corn-soya ration, provided normal growth when tested in chicks.

Example 3

*Crambe abyssinica* seeds were mechanically dehulled, tempered to a moisture content of 7 percent, and flaked by passage through smooth rolls. Then 12 pounds of flakes were defatted with hexane at 130–140° F. and airdesolventized. A 6-pound portion of the defatted meal was preheated to 180° F. with indirect steam and then subjected for 15 minutes to sparge steam in a small cooker equipped with steam and mixing means to inactivate the enzyme. By Kjeldahl analysis the flakes were shown to contain 7.17-percent nitrogen. By gravimetric sulfate analysis the flakes showed a thioglucoside content of 9.5 percent. Sinapine fluorescence was strong. Then 390 ml. of concentrated ammonium hydroxide solution (29.4-percent $NH_3$), equivalent to 0.04 g. of $NH_3$ per gram of flakes that contained 1.7 percent of residual oil and 7.6-percent moisture, was sprayed onto the flakes. The reaction temperature was raised to 190° F. and held there for 30 minutes. Then sparge steam was admitted for 15 minutes, followed in turn by 30 minutes of slight vacuum to partially dry the flakes which were discharged at a temperature of 217° F. Reanalysis of the ammoniated flakes gave a Kjeldahl nitrogen of 8.13 percent and a zero value for thioglucoside and thiooxazolidone. However, the chromatograms gave a very faint fluorescence under U.V. light, indicating the presence of some residual sinapine.

Example 4

A 15-pound portion of Crambe meal formed from the commercially defatted flakes of Example 1 but containing only 5-percent moisture instead of 11.3 percent was placed in a steam-jacketed ribbon blender having bottom admitting means for either gaseous ammonia or sparge steam. The meal was indirectly heated to 200° F. and ammonia gas was admitted for 60 minutes at the rate of 0.93 g. per minute corresponding to 0.062 g. $NH_3$ per minute per pound of meal or a total of 3.74 g. of $NH_3$ per pound of meal (ca. 0.008 g. per gram of meal). The temperature during the ammonia admission period varied between 200° F. and 210° F. but all of the ammonia was absorbed and there was no build-up in pressure. Following the ammonia admission, sufficient water was added to raise the moisture content of the meal to 30 percent, and live steam was admitted for a 30-minute period. Then a vapor outlet pipe was opened and the meal was partially dried for 30 minutes using jacket steam. After cooling in the open, the meal containing 8.4-percent moisture, gave a Kjeldahl nitrogen of 6.74 percent. Paper chromatograms showed the absence of thioglucoside and thiooxazolidone. A faint fluorescence under U.V. light indicated a trace of sinapine.

Example 5

A 15-pound batch of Crambe meal identical with the meal used in Example 4 was treated in the same way excepting that the moisture content of the hot meal prior to the ammoniation was increased to the level of 20 percent, also that addition of ammonia was at the somewhat greater rate of 0.086 g. per pound of meal per minute, and that the ammonia admission was not followed by a steam injection period for completing the reaction. Analysis of the air-cooled meal containing 7.2-percent moisture gave a Kjeldahl nitrogen of 7.10 percent. Chromatograms for thioglucoside and thiooxazolidone were negative, but a very faint fluorescence indicated a trace of sinapine.

We claim:

1. A process for debittering and detoxifying the defatted flakes and meals of thioglucoside-containing seeds of herbs belonging to the mustard family and selected from the group consisting of *Crambe abyssinica* and *Brassica* (rape) whereby the flakes and meals are made suitable for use in livestock feeds, said process comprising:
    (a) steaming the defatted seed material for 15 to 30 minutes at about 200–215° F. to inactivate the endogenous enzymes and thus prevent enzymatic hydrolysis of the thioglucosides;
    (b) contacting the steamed seed material for at least about 30 minutes with a reactant selected from the group consisting of ammonia gas and aqueous ammonium hydroxide in an amount exceeding a mole for mole equivalence based on the thioglucoside content and sufficient to provide at least about a 10 percent increase in the total nitrogen content of the seed material;
    (c) subjecting the ammoniated seed material to live steam for about 30 minutes;
    (d) and drying under reduced pressure.

References Cited

UNITED STATES PATENTS

| | | | |
|---|---|---|---|
| 3,173,792 | 3/1965 | Mustakas et al. | 99—2 |
| 3,294,776 | 12/1966 | Layton et al. | 99—17 |

A. LOUIS MONACELL, *Primary Examiner.*

N. ROSKIN, *Assistant Examiner.*